United States Patent
Swaine

(10) Patent No.: US 7,134,117 B2
(45) Date of Patent: Nov. 7, 2006

(54) INSTRUCTION TRACING IN DATA PROCESSING SYSTEMS

(75) Inventor: Andrew Brookfield Swaine, Welwyn Garden City (GB)

(73) Assignee: ARM Limited, Cambridge (GB)

( * ) Notice: Subject to any disclaimer, the term of this patent is extended or adjusted under 35 U.S.C. 154(b) by 690 days.

(21) Appl. No.: 10/352,030

(22) Filed: Jan. 28, 2003

(65) Prior Publication Data

US 2004/0024995 A1 Feb. 5, 2004

(51) Int. Cl.
G06F 9/44 (2006.01)
G06F 9/45 (2006.01)

(52) U.S. Cl. .................. 717/128; 717/125; 717/129

(58) Field of Classification Search ........ 717/124–136, 717/144–146
See application file for complete search history.

(56) References Cited

U.S. PATENT DOCUMENTS

| | | | |
|---|---|---|---|
| 5,724,505 A | | 3/1998 | Argade et al. |
| 5,943,498 A | * | 8/1999 | Yano et al. .................. 717/128 |
| 6,145,123 A | * | 11/2000 | Torrey et al. ................ 717/128 |
| 6,256,775 B1 | * | 7/2001 | Flynn .......................... 717/127 |
| 6,513,134 B1 | * | 1/2003 | Augsburg et al. ............ 714/38 |
| 6,694,507 B1 | * | 2/2004 | Arnold et al. ............... 717/108 |
| 6,813,731 B1 | * | 11/2004 | Zahavi et al. ................ 714/45 |
| 6,826,747 B1 | * | 11/2004 | Augsburg et al. ........... 717/128 |
| 6,941,545 B1 | * | 9/2005 | Reese et al. ................. 717/130 |
| 6,948,155 B1 | * | 9/2005 | Agarwala et al. ........... 717/128 |
| 6,954,923 B1 | * | 10/2005 | Yates et al. .................. 717/130 |
| 7,000,225 B1 | * | 2/2006 | Sangavarapu et al. ...... 717/129 |
| 7,003,699 B1 | * | 2/2006 | Swaine et al. ................ 714/30 |
| 7,013,456 B1 | * | 3/2006 | Van Dyke et al. .......... 717/130 |

OTHER PUBLICATIONS

Chilimbi etal, "Designing a trace format for heap allocation events", ACM ISMM, pp. 35-49, 2000.*
Kaplan, ":Collecting whole system refernce traces of multiprogrammed and multithreaded workloads", ACM WOSP, pp. 228-237, 2005.*
Rawling et al, "Potential performance of parallel conservative simulation of VLSI circuits and systems", IEEE, pp. 71-81, 1992.*
Peischi et al, "Error trace in model based debugging of hardware description languages", ACM AADEBUG, pp. 43-47, 2005.*
IBM Technical Disclosure Bulletin, Dec. 1993, vol. 36, No. 12, pp. 245-248.
"Trace Format" Jan. 22, 1998, at archive.org archive of www.base.com/gordon/sky/description/tech/traces.html.

* cited by examiner

Primary Examiner—Anil Khatri
(74) Attorney, Agent, or Firm—Nixon & Vanderhye P.C.

(57) ABSTRACT

A tracing circuit 8 within an apparatus for data processing 2 generates trace data including instruction trace words encoding trace events W, E, N representing program instruction execution. The instruction trace words have a predetermined length and each represent a sequence of trace events corresponding to a combination of execution of one or more program instructions combined with one or more trace events that are other than execution of a program instruction word. Particular examples are a sequence of executed program instructions terminated by a program instruction that fails its condition codes or a sequence of wait processing cycles terminated by a program instruction that executes.

18 Claims, 5 Drawing Sheets

|  | Non cycle-acc | | cycle-acc | |
|---|---|---|---|---|
|  | Atoms | Trace | Atoms | Trace |
| MOV | E |  | WE |  |
| SUBS | E |  | WE |  |
| ADDNE <fail> | N | EEN | WN | WE WE WN |
| B label 1 | E |  | WE | WE |
| - | - |  | W |  |
| - | - |  | W |  |
| Label 1: LDR <data 1> | E <data> | EE, <data 1> | WE, <data 1> | WWWE, <data 1> |
| CMP | E |  | WE |  |
| BEQ <fail> | N | EN | WN | WE WN |

FIG. 4    Cycle accurate

INSTRUCTION TRACING IN DATA PROCESSING SYSTEMS

BACKGROUND OF THE INVENTION

1. Field of the Invention

This invention relates to data processing systems. More particularly, this invention relates to the tracing of program instructions being executed by a data processing circuit.

2. Description of the Prior Art

As data processing systems increase in complexity, it is becoming more important to provide comprehensive and effective mechanisms for analysing the behaviour of such systems, for example, as part of system debugging and the like. Furthermore, as the speed of the data processing systems increases and the number of integrated elements typically contained increases, there is a corresponding increase in the amount of trace data that is generated and the speed at which it is generated.

It is known to provide on-chip trace facilities for data processing systems in which dedicated circuitry is provided upon the integrated circuit for tracing the activity of the circuit and streaming the trace data out or buffering that trace data to be streamed out later. A particular constraint is that the amount of trace data generated can be disadvantageously large resulting in an increase in the on-chip memory requirements for buffering that trace data and/or an increase in the required provision for transmitting the trace data out of the chip, such as an increase in the number of pins that need to be dedicated to the trace functionality. In this context, measures which reduce the size of the trace data generated are strongly advantageous.

It is known to provide systems in which instruction trace data which provides an indication of whether a particular instruction executed is encoded in instruction trace words. This is done by encoding runs of sequential instructions executed terminated by a branch instruction. Thus, a particular instruction trace word may encode the detection of a run of four sequential instructions execution followed by a branch instruction.

SUMMARY OF THE INVENTION

Viewed from one aspect the present invention provides an apparatus for processing data, said apparatus comprising:

(i) a data processing circuit operable over a sequence of processing cycles to perform data processing operations in response to program instructions; and (ii) a tracing circuit operable to generate instruction trace data indicative of operation of said data processing circuit in response to said program instructions;

(iii) wherein said instruction trace data includes at least one instruction trace word of a predetermined length encoding a sequence of trace events resulting from processing performed on consecutive processing cycles by said data processing circuit, said sequence of trace events including:

(iv) at least one trace event corresponding to execution of a program instruction by said data processing circuit; and (v) at least one trace event corresponding to other than execution of a program instruction by said data processing circuit.

The invention recognises that there is a problem with the prior art approach of encoding runs terminated by branches as instruction trace words since short loops are frequently employed in hand written or compiled code and these will be relatively inefficiently represented in compressed form by the instruction trace word since the runs between branches at the end of such loops can be relatively short. Having recognised this problem, the invention provides the solution of providing instruction trace words representing a sequence of trace events performed on consecutive processing cycles that include one or more trace events corresponding to execution of an instruction and one or more trace events corresponding to a trace event other than execution of a program instruction. This provides a convenient and efficient way of representing the response of the data processing circuit to its program instructions.

Whilst it will be appreciated that many possibilities exist, one particular preferred approach is to encode sequences of trace events comprising one or more trace events corresponding to execution of respective program instructions in combination with a trace event corresponding to a conditional program instruction not being executed. This is found to be an efficient and effective way of encoding instruction trace activity in many real life systems.

Whilst it will be appreciated that the conditional program instruction not being executed could precede or succeed the one or more program instructions that are executed, in preferred embodiments the conditional program instruction not being executed follows the one or more program instructions that are executed. This arrangement simplifies the implementation.

Another preferred way of representing the response of the data processing circuit to program instructions is to use instruction trace words encoding a sequence of trace events comprising one or more trace events corresponding to respective wait processing cycles in combination with a trace event corresponding to a program instruction being executed.

As the complexity of data processing systems increases, and particularly with the increased use of system-on-chip designs with a large number of different functional elements, it is becoming increasingly desirable to be able to achieve cycle accurate instruction tracing and this approach allows the efficient representation of such cycle-accurate tracing with instruction trace words.

The implementation of this encoding is simplified when the trace event corresponding to a program instruction being executed follows the one or more wait cycles traced.

Within a pipelined processing system, there are effectively multiple program instructions being processed in parallel at different points within the instruction pipeline. Preferred embodiments of the invention deal with this by treating a trace event corresponding to execution of a program instruction as the program instruction reaching a predetermined position within the processing pipeline.

It will be appreciated that this could be fetching of the instruction, decoding of the instruction, execution of the instruction or another point in the pipeline. A program instruction could be aborted after having reached a predetermined position within the pipeline which is interpreted as corresponding to execution resulting in a requirement to insert data indicating that the instruction concerned did not actually complete its execution.

A particularly convenient position within the pipeline to take as corresponding to execution of a program instruction is commencement of the execution of the program instruction within the execution stage of the pipeline. Another convenient position within the pipeline to take as corresponding to execution of a program instruction is the completion of the execution of the program instruction within the execution stage of the pipeline.

Whilst it will be appreciated that the instruction trace data could be provided as a separate stream from other trace data, preferred embodiments of the invention operate to also generate data trace data indicative of data values processed by the data processing circuit (e.g. either as input or output) and interleave this data trace data with the instruction trace data in a common data stream. This advantageously reduces the resource requirements for transferring the trace data off the system, and allows the instruction trace data to be correlated with data trace data enabling more detailed analysis of the operation of the data processing circuit.

Whilst it will be appreciated that the data processing circuit could take a wide variety of forms, the present technique is particularly well suited to the generation of trace data associated with the relatively complex program instructions and responses to those instructions that are associated with processor cores.

Whilst the trace circuit could operate to directly stream the instruction trace data off the system as soon as it is generated, preferred embodiments of the invention are ones in which the trace circuit includes a trace data memory for buffering the instruction trace data. This allows the ability to rapidly collect trace data at real operational speeds and the encoding of the instruction trace data in accordance with the present technique makes efficient use of the trace data memory provided.

Viewed from another aspect the present invention also provides a method of processing data, said method comprising the steps of:

(i) performing over a sequence of processing cycles of a data processing circuit data processing operations in response to program instructions; and (ii) generating instruction trace data indicative of operation of said data processing circuit in response to said program instructions;

(iii) wherein said instruction trace data includes at least one instruction trace word of a predetermined length encoding a sequence of trace events resulting from processing performed on consecutive processing cycles by said data processing circuit, said sequence of trace events including:

(iv) at least one trace event corresponding to execution of a program instruction by said data processing circuit; and (v) at least one trace event corresponding to other than execution of a program instruction by said data processing circuit.

A complementary aspect of the present invention to the above discussed techniques for generating instruction trace data is the provision of mechanisms and techniques for analysing such data once generated.

Accordingly, viewed from another aspect the present invention provides apparatus for analysing trace data, said apparatus comprising:

(i) analyser logic responsive to instruction trace data including at least one instruction trace word of a predetermined length encoding a sequence of trace events resulting from processing performed on consecutive processing cycles by a data processing circuit, said analyser logic being operative to identify instruction trace words representing a sequence of trace events including:

(ii) at least one trace event corresponding to execution of a program instruction by said data processing circuit; and (iii) at least one trace event corresponding to other than execution of a program instruction by said data processing circuit.

It will be appreciated that the analysing of the trace data that has been generated may also be considered as a method of analysis and may conveniently be provided using a general purpose computer operating under control of a suitable computer program.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2:
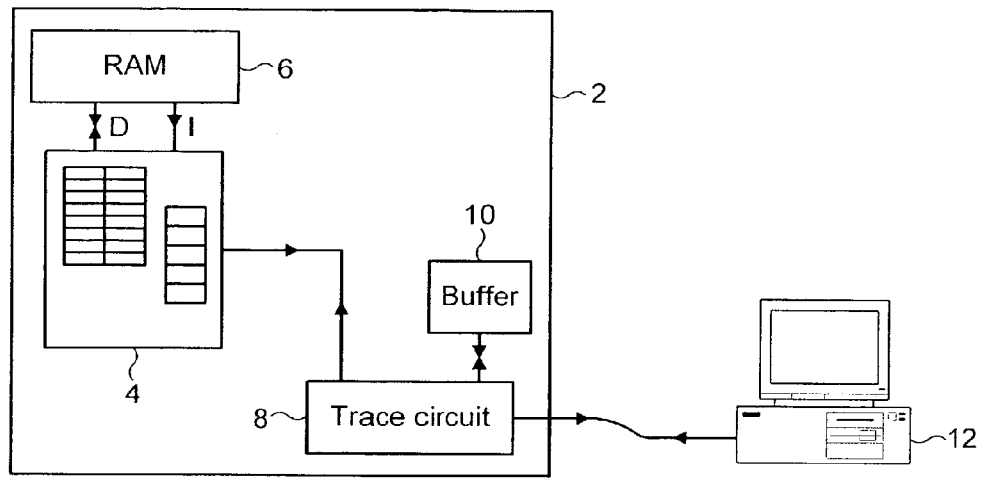
FIG. 1 schematically illustrates a data processing apparatus including a data processing circuit responsive to program instructions and an on-chip tracing circuit all connected to a general purpose computer for analysing the trace data generated.
FIG. 2 illustrates a sequence of program instructions and the way that these may be encoded into instruction trace words in both a noncycle accurate mode and a cycle accurate mode.

FIG. 1 illustrates a system-on-chip integrated circuit 2 which includes within it a processor core 4 that executes program instructions stored within a memory 6. The memory 6 stores both the program instructions to be executed and the data values used as input to the processor core 4 and generated as output from the processor core 4. A tracing circuit 8 is associated with the processor core 4 and the rest of the integrated circuit 2 and serves to generate trace data indicative of the operation of the circuits. The general operation of such a tracing circuit 8 may follow that provided by the ETM products of ARM Limited, Cambridge, England. These ETM circuits provide a suite of options, such as trigger points and the like for commencing tracing and the ability to trace both instructions and data. The present technique relates to an improved way in which the instruction trace data may be represented within such systems.

The trace data generated by the tracing circuit 8 is stored within a buffer memory 10 which acts as a trace data memory and temporarily stores the trace data generated, typically at full speed, prior to this being transmitted out from the integrated circuit 2 to an analysing computer 12, through appropriate interfacing circuits. The general operation of such a buffer memory 10 may follow that provided by the Embedded Trace Buffer (ETB) products of ARM Limited, Cambridge, England.

Although not illustrated in FIG. 1 for reasons of clarity, it will be appreciated that the integrated circuit 2 will typically contain many further functional elements as part of a system-on-chip design and the detailed and efficient tracing of the activity of these different components is highly beneficial in developing and debugging the overall system-on-chip design.

FIG. 2 illustrates a sequence of program instructions, in this case ARM instructions, that are executed by the processor core 4. The tracing may occur in a noncycle accurate mode or a cycle accurate mode depending upon the user's requirements. The cycle accurate mode will generate more information, but will require more space to represent this information as wait states are also encoded.

The trace events of the instruction processing activity that are represented within the instruction trace words may be termed atoms and can take a wide variety of forms. In the noncycle accurate mode, the atoms being traced are ones indicating that a particular instruction executed or that a particular conditional instruction was not executed due to failing its conditional requirements. Thus, in the example of FIG. 2, the MOV and SUBS instructions both execute resulting in E atoms and the ADDNE instruction does not execute as it fails its not equal condition code requirements. The sequence of trace events corresponding to the execution of two instructions followed by the non-execution of the ADDNE instruction due to failure of its conditional requirements is treated as a sequence to be encoded and represented as an instruction trace word of a predetermined length.

The branch instruction B then executes and redirects processing to the LDR instruction which also executes and results in a transfer of a data word <data1>. The execution of the B and LDR instructions are treated as a run of two executes terminated by the occurrence of a data event which is embedded within the combined trace data stream.

The final two instructions are a CMP instruction which executes and a BEQ instruction which fails to cause a branch since the equal condition is not satisfied and accordingly the instruction is not executed. The E and N atoms are treated as a sequence which is encoded as an instruction trace word EN.

In the cycle accurate mode the same sequence of instructions is executed. In this mode the atoms include a WE atom indicating that an instruction is executed and consumes a processing cycle, a WN atom indicating that an instruction fails its condition codes and does not execute but does consume a processing cycle and a W atom indicating that a wait cycle is present, such as following the WE atom of a multi-processing cycle instruction.

The first three instructions are encoded as an instruction trace word representing WEWEWN. The branch instruction B consumes three processing cycles. The first of these is a WE cycle and is encoded as its own instruction trace word. The next two cycles are wait cycles and are combined with the WE cycle of the following LDR instruction to be encoded as an instruction trace word representing WWWE. The final two instructions are encoded as an instruction trace word representing WEWN.

Whilst it will be appreciated that the detailed encoding of the instruction trace words could take a wide variety of forms, a particular example of an encoding that may be used is given in the following description:

1.1 Introduction

This section describes all the protocol changes in ETMv3 (using the instruction trace words described above) that are not backwards compatible with ETMv2 (as is provided by ARM Limited, Cambridge, England).

P-headers compress the information currently given by ETMv2 pipestats, and appear in the same packet stream as other data. In order to accurately specify their meaning, new terminology must be introduced. The 16 pipestats in ETMv2 represent the following information:
when an instruction is executed
for each instruction executed, whether it passed its condition codes
when data is placed in the fifo
on which cycle each of the above occurred
the occurrence of the trigger
when trace capture should be disabled The branch phantom pipestats can be viewed as indicating two instructions having executed in a cycle.

ETMv3 provides alternative mechanisms for indicating the trigger and trace disabled, which for our purposes should be viewed as the replacement pipestat and WT respectively. When data appears in the trace stream, it always corresponds to the most recent cycle or instruction. Consequently, it is not necessary to indicate whether data follows, so the remaining 14 pipestats can be reduced further to 7 possibilities. These can be viewed as representing a combination of the following three atoms:
W: a cycle boundary (all pipestats indicate this)
E: an instruction which passed its condition codes
N: an instruction which failed its condition codes The mappings are as follows:

| Pipestats | Atoms |
|---|---|
| IE, DE | WE |
| IN, DN | WN |
| WT, DW | W |
| TR, TD | N/A |
| PTIE, PTDE | WEE |
| PTIN, PTDN | WEN |
| PNIE, PNDE | WNE |
| PNIN, PNDN | WNN |

1.2 Encoding 1.2.1 P-Header Meanings

The sequence of pipestats can then be represented by a sequence of these three atoms. Where cycle-accurate tracing is not required, a more compressible stream can be generated by removing the W atoms. In this case, since most instructions pass their condition codes, strings of Es are likely, especially if data tracing is disabled. If data tracing is enabled, the sequence must end to allow data to be inserted into the trace stream. However, in this case the amount of trace produced for the data trace will swamp the pipestat trace anyway. When cycle accurate tracing is required, strings of Ws are likely, as are strings of WEs for instructions executed on consecutive cycles.

1.2.2 Assignment

In ETMv2 all headers, other than branch addresses, contained a 'C' bit that indicated whether or not a further packet followed in the same cycle. By embedding pipestat information in the trace stream, this bit is no longer necessary. This provides space for the new headers. The new header encodings are as follows:

| Value | Cycle-accurate | New | Payload (max bytes) | Description |
|---|---|---|---|---|
| Cxxxxxx1 | | no | Additional address bytes (4) | Branch address |
| 00000000 | | yes | None (but repeated) | A-sync |
| 00000100 | ! cycacc | | | Reserved |
| 00000100 | cycacc | yes | Cycle count (5) | Cycle Count: $1-2^{32}$xW (see below) |
| 00001000 | | yes | As specified below (14) | I-sync |

-continued

| Value | Cycle-accurate | New | Payload (max bytes) | Description |
|---|---|---|---|---|
| 00001100 | | yes | None | Trigger |
| 0TT0SS00 | | no | Data (4) | Load Miss data, TT = tag (1–3) |
| 01x10000 | | | | Reserved |
| 01A1TT00 | | no | Address (5) | Load Miss occurred, TT = tag (1–3), A = Address follows (where address tracing enabled) |
| 00x1xx00 | | | | Reserved |
| 00AMSS10 | | no | Address (5) Data (4) | Normal data, A = First data packet (address expected) |
| 010xxx10 | | | | Reserved |
| 01100010 | | yes | None | Data Suppressed (DSup) |
| 01100110 | | yes | | Ignore |
| 01101010 | | no | None | Value not Traced (VnT) |
| 01101110 | | no | Context ID (4) | Context ID |
| 0111xx10 | | | | Reserved |
| 1NEEEE00 | ! cycacc | yes | None | Format 1: 0–15xE, 0–1xN |
| 1000FF10 | ! cycacc | yes | None | Format 2: 1x(N/nE), 1x(N/nE)ᵃ |
| 1N0EEE00 | cycacc | yes | None | Format 1: 0–7x(WE), 0–1xWN |
| 1E1WWW00 | cycacc | yes | None | Format 3: 1–8xW, 0–1xE |
| 1000FF10 | cycacc | yes | None | Format 2: 1xW, 1x(N/nE), 1x(N,nE)ᵃ |
| 1001xx10 | | | | Reserved |
| 101xxx10 | | | | Reserved |
| 11xxxx10 | | | | Reserved |

ᵃBit 1 represents the first instruction, and bit 2 represents the second.

Since the run length of Es on consecutive cycles is likely to be less than that when ignoring cycle boundaries, the header space corresponding to runs of over 7 instructions is reused. The average run length of Ws is lower.

1.2.3 Missing P-Headers

In cycle-accurate mode, there is no format which provides a number of Ws ending in an N. Instructions which fail their condition codes do not interlock, preventing them from causing wait states between them and the previous instruction. Conditional instructions are generally preceded by either:

Another conditional instruction, generally with the same condition codes

An instruction that sets the condition codes. These are data processing instructions which usually execute in one cycle.

As a result it is currently expected to be unlikely that this format would used often enough to justify the header space, and format 1 will suffice instead.

1.3 Cycle Count

A Cycle Count p-header is provided, which is followed by 1 to 5 bytes of data. A 1 in bit 7 of each byte indicates that another byte follows, in the same way as branch addresses. Up to 32 bits are output in this way; any missing high order bits are 0. This value is a number of Ws. The first occurrence of this packet following a non-periodic i-sync indicates the number of additional Ws to be inserted into the trace stream before that i-sync. For subsequent occurrences the Ws must be inserted at the point they are output, in the same way as all other p-headers.

The former use is mandatory, and allows the number of cycles between trace regions to be output efficiently. The latter use is optional; it allows more efficient tracing of long gaps within a trace region, and allows trace output to be disabled while still allowing other packets (such as Load Miss Data) to be output before trace is re-enabled.

A cycle count of 0 indicates that a counter overflow. When this is encountered the length of the gap is unknown.

1.4 P-Header Generation

The rules for generating p-headers are given below. The rules are implementation defined rather than architectural; any p-headers which unpack to the correct set of atoms is allowed, however inefficient. Note that this means that, in the extreme, a device may generate one p-header per cycle, although obviously this would not be a preferred implementation. The rules below are those that are implemented in ETM10J. Improvements may be made in future implementations.

A branch phantom refers to a correctly predicted branch in parallel with another executed instruction, which would have created a P* pipestat in ETMv2. It does not refer to a folded branch that does not execute in parallel with another instruction.

Each cycle, the ETM calculates the p-header that would be output. This is either output immediately or saved for the next cycle. If saved, the p-header generated in the next cycle must be based on it, so that no atoms are lost.

1.4.1 Non Cycle-Accurate Mode

If two instructions are executed in a cycle (ie a branch phantom occurred) and the first was ccfailed, format 2 is used. This corresponds to PN* pipestats. Format 1 is used in all other cases.

Format 2 p-headers are always output immediately. A saved format 1 p-header is output whenever any of the following occur:

a ccfailed instruction is executed (the N bit is set)
other data packets are generated
the count of Es reaches 15
the count of Es reaches 14 and the next cycle contains a branch phantom
the next cycle contains a ccfailed branch phantom (a PN* pipestat)
tracing is disabled
the trigger occurs It may be easier to always output a format 1 p-header whenever the count of Es reaches 14.

Looking ahead to see if the next cycle contains a (ccfailed) branch phantom does not require an extra pipeline stage, since it does not matter whether or not it is traced. If it is not traced, tracing has been disabled and the p-header must be output anyway.

1.4.2 Cycle-Accurate Mode

If a ccfailed branch phantom occurred, format 2 is used, as before. If one instruction was executed, format 1 is used. If no instructions were executed, format 3 is used. Format 2 p-headers are always output immediately. A saved format 1 p-header is output whenever any of the following occur:

a ccfailed instruction is executed (the N bit is set)
other data packets are generated
the count of Es reaches 7
the next cycle contains a branch phantom (a P* pipestat)
tracing is disabled
no instructions are executed in the next cycle
the trigger occurs A saved format 3 p-header is output whenever any of the following occur:

an instruction is executed
other data packets are generated the count of Ws reaches 8
the next cycle contains a branch phantom (a P* pipestat) or a ccfailed instruction
tracing is disabled
the trigger occurs Looking ahead to see if any instructions are executed in the next cycle does not require an extra pipeline stage, for the same reason as looking ahead for branch phantoms.

A cycle count is only output following non-periodic i-sync. It is output on the first cycle following i-sync in which there is no other trace to be output. While it could in theory be output in parallel with other p-headers, or with a branch address, it is not for ease of implementation. The counter itself is reset to 1 (not 0) in the cycle following the last p-header output for a trace region. This ensures that the counter does not need to be reset before it is output.

1.5 Synchronization

There are three forms of synchronization: a-sync (alignment), i-sync (instruction flow) and d-sync (data address). All three must occur periodically for correct synchronization.

1.5.1 Frequency

Each form of synchronization must occur in general at least once every n cycles in which trace is output (ie. not counting TD cycles), where n is the value of the Synchronization Frequency register, 0x78. The implementation may delay synchronization in special cases by up to another n cycles, usually to prevent overflow. The exact algorithm is implementation defined. ETM10J is expected to count all cycles while tracing is enabled (not just those cycles in which trace is actually output) and so conforms to this definition by outputting trace more frequently than the minimum required.

Note that this means that the tools will probably wish to vary the value of the synchronization frequency register based on the port width, as would be the case for ETMv2. This is because it is expected that the tools will wish to aim for a set number of synchronization points in the buffer in total, and it takes less cycles of trace to fill a buffer when a wide port is in use than when a narrow port is in use.

1.5.2 A-sync (Alignment Synchronization)

Periodically a sequence of 5 or more a-sync p-headers (00000000) are output, followed by a single null p-header (10000000This is equivalent to a string of 47 or more 0 bits followed by a 1. A-sync (null) bytes should be ignored by the decompressor when encountered normally.

To synchronize, the decompressor must search for this sequence, which cannot occur in any other way. While trace capture devices will usually be byte aligned, this may not be the case for sub-byte ports. Therefore the decompressor must realign all data following the a-sync sequence if required.

The next byte will be a header, but this header can be of any type—it does not have to be an i-sync header, and may be another p-header.

For example, in a byte-aligned system, an a-sync sequence followed by a single E p-header may be represented as 00 00 00 00 00 80 84. However, the same sequence offset by 1 bit, as a consequence of being captured from a 1 bit port, may be represented as 01 00 00 00 00 40 42. This will not occur if the port size is 1, 2 or 4 bits and the trace capture device is completely accurate over the course of the trace run. However, if it captures one cycle incorrectly, either capturing an extra cycle or missing one out due to instability on the TRACECTL pin, all subsequent capture will be offset. By accommodating for the new alignment within each byte, the error can be localized. This also allows less common port sizes to be implemented, such as 3 or 6 bits.

1.5.2.1 Justification

A string of 47 zero bits requires at least five consecutive zero bytes. If only 4 consecutive bytes are zero, the maximum length of zero bits that can be constructed is 46: 32 for the zero bytes, and 7 for each of the surrounding bytes, which are not themselves zero. Therefore we must prove that no run of 5 or more consecutive zero bytes can be produced.

The places where a zero byte can occur, other than a-sync, are (along with their packet type):

the last byte of an instruction address (branch address, i-sync)

the last byte of a data address (normal data, load miss occurred)

the last byte of a cycle count (cycle count)

data (normal data, load miss data)

context ID (context ID, i-sync)

LSM address (LSiP i-sync)

Since all packets must be separated by a header, we only need consider sequences of bytes within a single packet. None of the above cases consist of more than 4 bytes, which is the maximum allowed length. Only two packet types occur in the above list more than once. Of these, the context ID in i-sync case can be discarded since it has an i-sync header on one side of it, and an i-sync information byte on the other, neither of which can be zero. There are two remaining cases:

Normal data: last byte of data address is zero, followed by zero data. If the data is zero, it will be compressed. Only the first byte of the data can ever be zero due to the compression, therefore this case will never arise.

LSiP i-sync: LSM address is zero, followed by zero branch address. This would indicate a data instruction on the reset vector which did not cause a branch, followed by a direct branch back to the reset vector from another exception vector. This is highly unlikely to occur. In addition, the LSM address is preceded by an i-sync byte with bit 7 set to indicate it is LSiP. In the worst case, where the following header is a null p-header (0x80) this reduces the maximum run of zero bits to 47 (40 for the five zero bytes, and 7 for the p-header). This functions as a valid a-sync anyway, since the p-header can be ignored and trace is aligned with this sequence. If the following header is not 0x80, the maximum run of zeros is reduced to 46, which is not valid for a-sync. Therefore this case cannot possibly cause a false a-sync.

Note that while a-sync bytes are ignored by the decompressor once alignment synchronization is achieved, they cannot be used as ignore bytes in case a run of 6 or more ignore bytes is required (likely if a port size of 8 bytes is implemented). Therefore a separate ignore code is required. While the null p-header could be used for this purpose, 0x66 has been chosen instead to make decompression errors easier to detect.

1.5.3 I-Sync (Instruction Synchronization)

Once the decompressor has found an a-sync sequence, it must search for an i-sync header. The complete chunk will be as follows:

| Normal i-sync | LSiP i-sync |
| --- | --- |
| I-sync header (1 byte) | I-sync header (1 byte) |
| Context ID (0–4 bytes) | Context ID (0–4 bytes) |
| Information byte (formerly TFO header) | Information byte (formerly TFO header) |
| Address of next instruction (4 bytes) | LSM address (4 bytes) |
| | Address of next instruction (1–5 bytes) |

This is the same as the TFO packet in ETMv2, except:
it is preceded by an i-sync p-header
the context ID comes before the information byte (this is to prevent the a-sync value occurring five times in succession)
bit 0 of the information byte is always set, to prevent the byte being zero and conflicting with a-sync.

The presence of a periodic i-sync packet does not imply an instruction executed, as was the case in ETMv2. Instead i-sync may occur at any time. The instruction address always gives the address of the next instruction to be executed, even for periodic synchronization (previously periodic synchronization gave the address of the instruction just executed).

An overflow occurs if periodic synchronization does not occur within twice the synchronization frequency, as before.

1.5.4 D-Sync (Data Address Synchronization)

This is accomplished as in ETMv2, by searching for a 5-byte data address.

1.6 Other New Headers

1.6.1 Trigger

When the trigger occurs, the trigger header is output along with any other header required. The TPA detects the trigger via a mechanism.

1.6.2 Ignore

The ignore header has no effect. It can be used in unused bytes of the trace port if trace must be output when there is insufficient trace to fill the entire port.

1.7 Signals to the Trace Capture Device

The trace captured is now a pure bit stream, as described above. However the TCD cannot determine on which cycles data should be captured and when the trigger occurs from this information. An extra signal, TRACECTL, is output which carries this information, in conjunction with TRACE-DATA[0] as described in sections Error! Reference source not found and Error! Reference source not found.

1.8 Programmer's Model Changes

A 3 bit field is provided in order to specify a trace port size in the following places:
Control register, bits 6:4—select the port size to use
PORTSIZE output—indicates the port size in use New encodings are obtained to accommodate wider trace ports:

| Value | New? | Port size |
| --- | --- | --- |
| 000 | | 4 bit |
| 001 | | 8 bit |
| 010 | | 16 bit |
| 011 | new | 24 bit |
| 100 | new | 32 bit |
| 101 | new | 48 bit |
| 110 | new | 64 bit |
| 111 | | Reserved |

Note that 48 bit and 64 bit ports are not supported by ETM10J. A port size larger than the width of the fifo for a particular device (e.g. 64 bit for an ETM7) indicates that the port size is equal to the fifo width. Such devices may not have a fifo.

Figure 3:
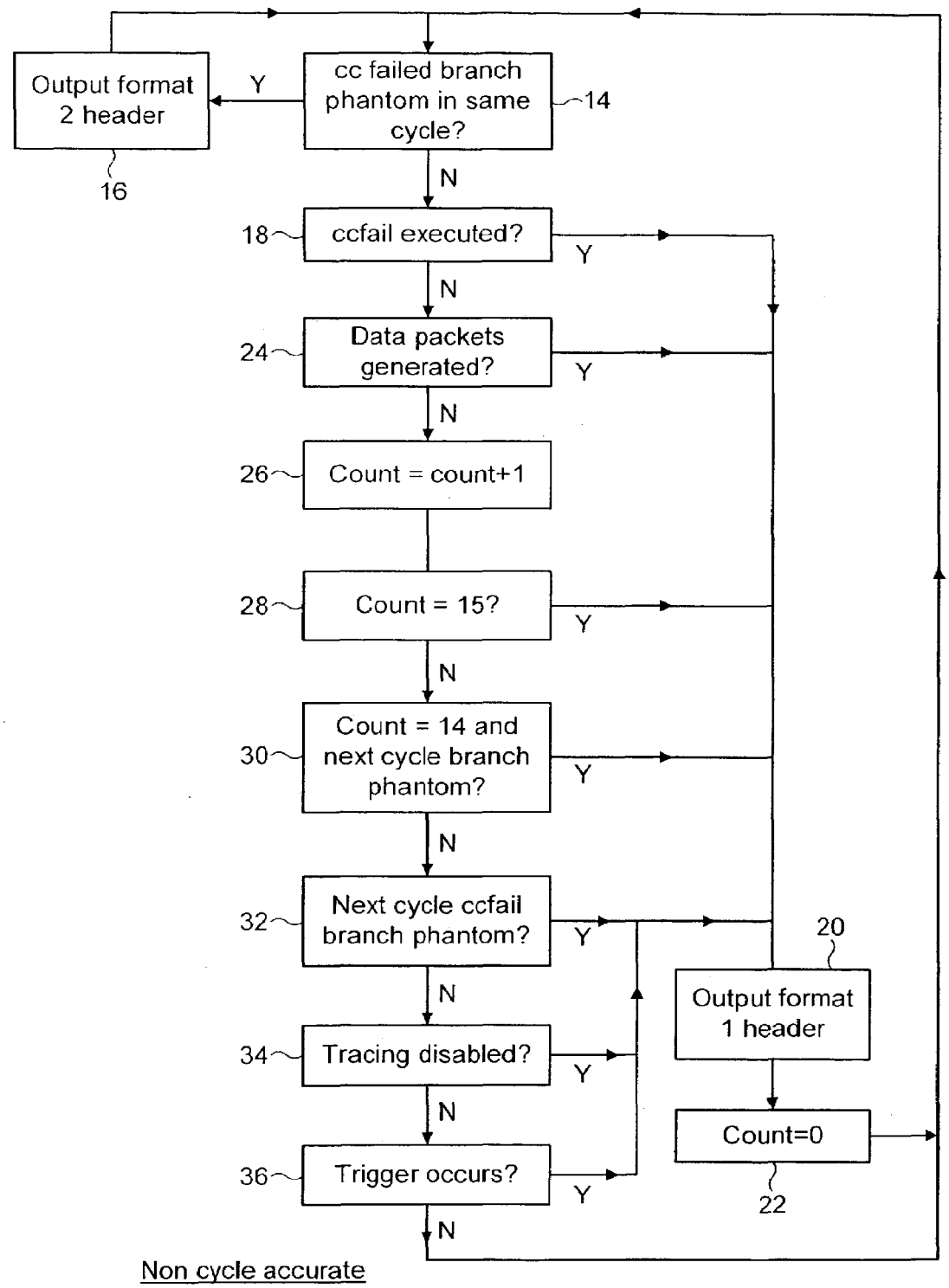
FIG. 3 is a flow diagram schematically illustrating the encoding operation of the tracing circuit during the noncycle accurate mode.

FIG. 3 is a flow diagram schematically illustrating the action of the tracing circuit 8 in a noncycle accurate mode.

Having first entered this mode or having just produced an instruction trace word, the processing reaches step 14. If the instruction being considered at this time is a condition code failed branch phantom occurring in the same cycle as another instruction (e.g. as the result of branch prediction), then output of an instruction trace word of format 2 is triggered at step 16 before processing returns to step 14. If a condition code failed branch phantom in the same cycle as another instruction is not detected, then processing proceeds to step 18 at which a test is made as to whether the instruction currently being considered fails its condition codes. If it does fail its condition codes, then processing proceeds to step 20 at which an instruction trace word of format 1 is output followed by resetting of the executed instructions count value to a 0 at step 22 and return of processing to step 14. If output of a format 1 instruction trace word was not triggered at step 18, processing proceeds to step 24 at which a determination is made as to whether or not any data packets have been generated by the processing activity which require interleaving in the trace data stream. Such interleaving when it occurs acts as a trigger to output an instruction trace word via step 20.

If data packets are not being generated, then processing proceeds to step 26 at which the count value is incremented. Step 28 then determines whether the count value has reached 15. This is the maximum value that may be encoded within a format 1 instruction trace word and accordingly if it is reached an instruction trace word must be output at step 20. If this condition is not met in step 28, then processing proceeds to step 30 at which a determination is made as to whether the count value is currently 14 and the next cycle is a branch phantom. If this condition is met, then processing proceeds to step 20. Steps 32, 34 and 36 are then performed, each serving as a trigger for a format 1 instruction trace word if they detect their respective condition of a next cycle being a condition code failed branch phantom, tracing activity being disabled or a tracing trigger event occurring. It will be appreciated that if one of the events tested for at steps 32 or 34 occurs, then the subsequent test(s) will not be made as the output of the format 1 instruction trace word will already have been triggered.

At an overall level, it will be seen that the processing of FIG. 3 serves to effectively count adjacent executed instructions up to a maximum of 16 instructions (indicated by a count value of 15) prior to a terminating event occurring, e.g. a condition code fail instruction being encountered as tested for at step 18.

Figure 4:
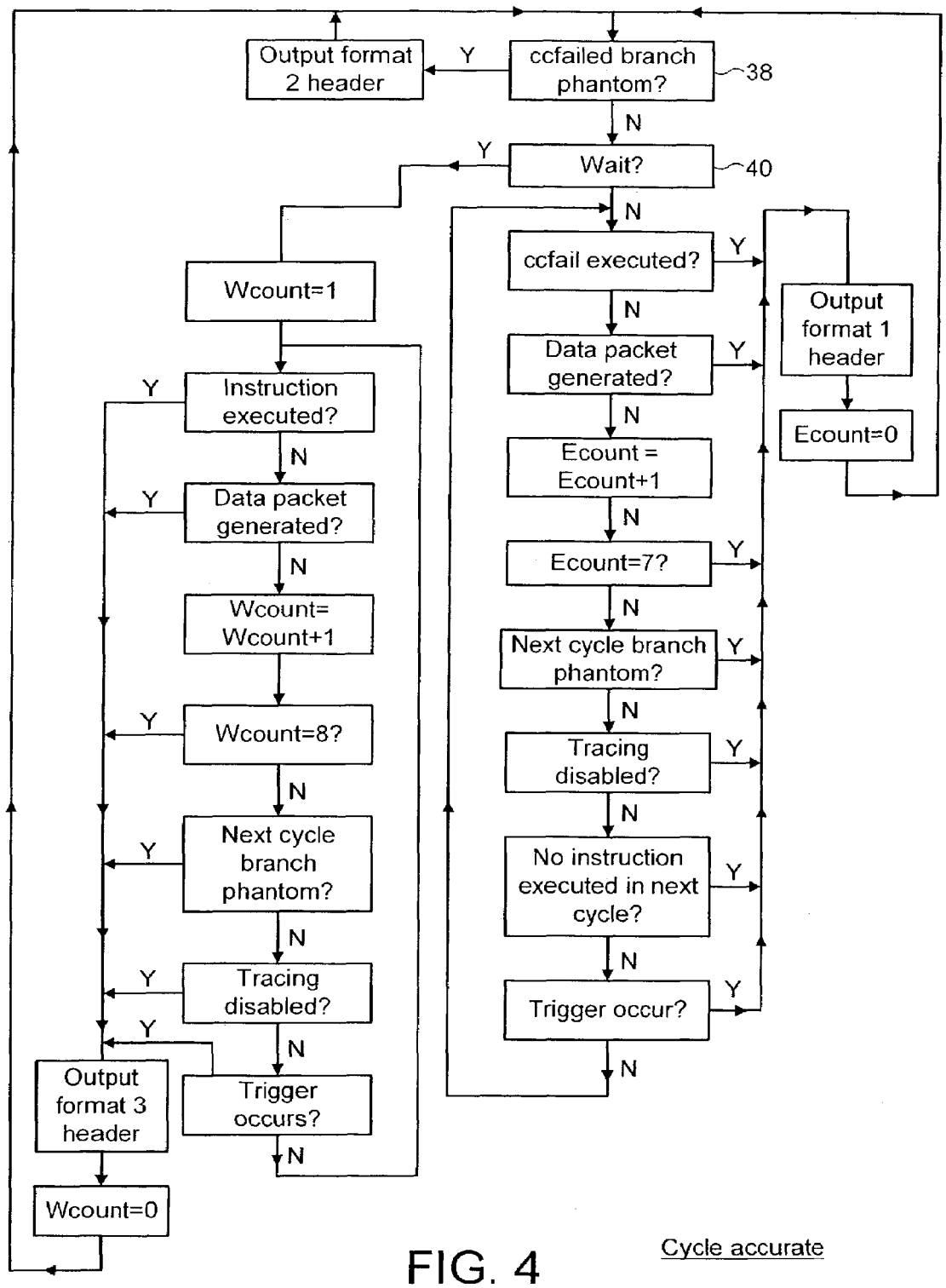
FIG. 4 is a flow diagram schematically illustrating the encoding operation of the tracing circuit during the cycle accurate mode.

FIG. 4 schematically illustrates the processing performed by the trace circuit 8 during a cycle accurate mode. After the initial test for a condition code failed branch phantom at step 38, a test is made at step 40 to determine whether the processing cycle under consideration is a wait processing cycle. If it is a wait processing cycle, then processing proceeds into a loop in which wait cycles W are counted until a terminating event is encountered, such as an instruction being executed, a data packet being generated, the count value reaching 8, a branch phantom being encountered in the next cycle, the tracing being disabled or a trigger event occurring, at which point the output of a format 3 instruction trace word is triggered and the wait cycle count is reset to 0.

If the test at step 40 does not detect a wait cycle, then a loop is entered that counts executed instructions until a terminating event is encountered at which point a format 1 instruction trace word is generated and the execution count reset to 0. The terminating events may be the generation of a data packet, the count value reaching 7, a next cycle branch phantom being detected, tracing being disabled, no instruction being executed in the next cycle or a trigger event occurring. This loop is broadly similar to the loop of FIG. 3, but the encoding is slightly different and in particular the maximum executed instruction count is only represented by three bits restricting the run to a shorter length.

Figure 5:
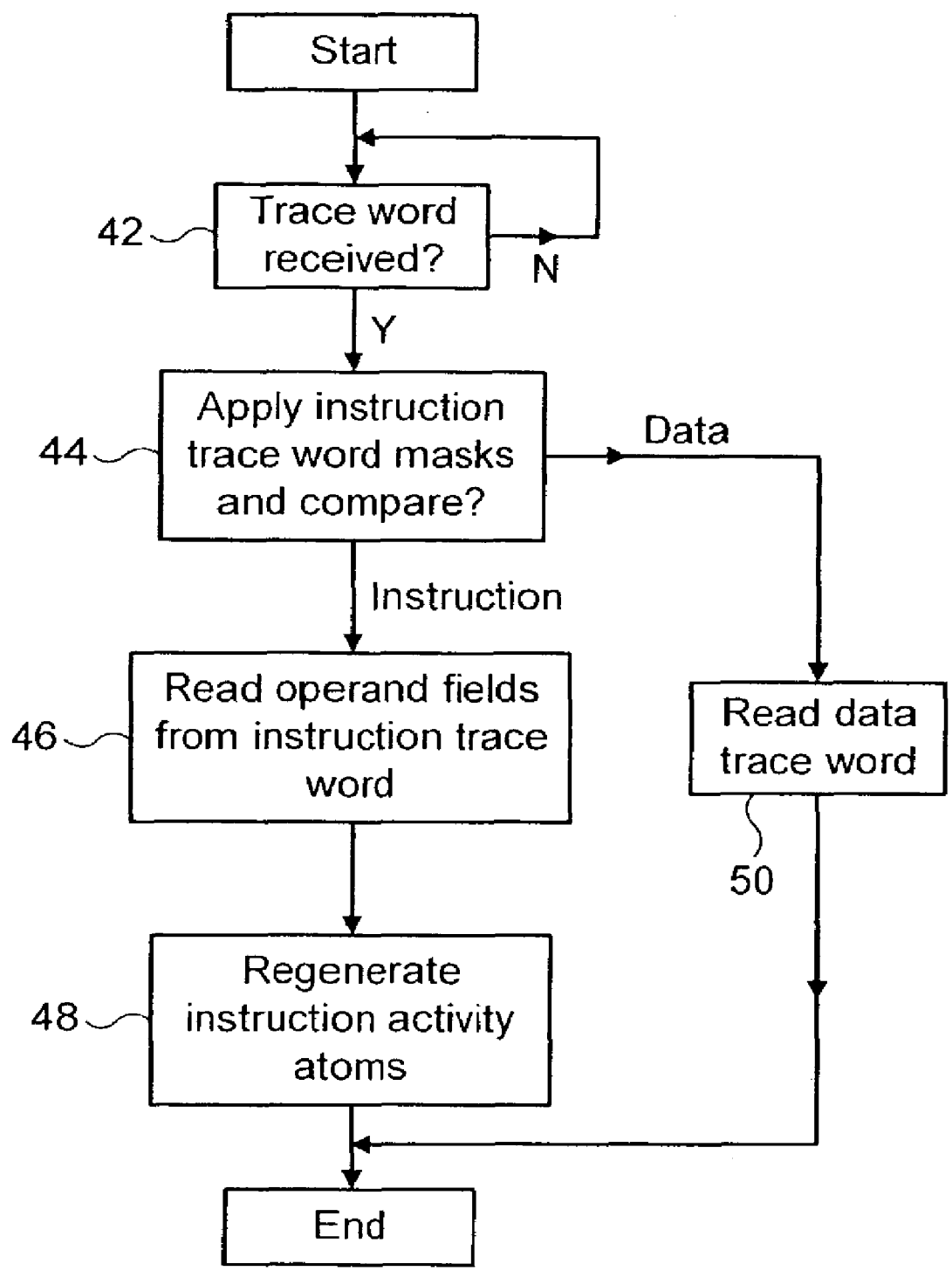
FIG. 5 is a flow diagram schematically illustrating the analysis of trace data including instruction trace words.

FIG. 5 is a flow diagram schematically illustrating the processing performed when analysing trace data including instruction trace words (such as in the computer 12) in accordance with the above described techniques. At step 42 the system waits until a trace data word is received. At step 44 a series of masks are applied to the trace word received and compare operations performed to try to identify the trace word as an instruction trace word in accordance with the encodings described above. This type of action may be considered as similar to instruction decoding.

If step 44 identifies an instruction trace word, then processing proceeds to step 46 at which the field values within the instruction trace word are read and used at step 48 to regenerate the instruction trace event activity atoms that are represented by the instruction trace word and accordingly should be made available to the analyser. If the tests at step 44 do not identify an instruction trace word, then processing proceeds to step 50 at which the trace word is treated as a data trace word.

It will be appreciated that the processing of FIG. 5 may be performed by special purpose hardware operating in accordance with this method or a general purpose computer operating under control of a computer program. The architecture of an example of such a general purpose computer that may be used to perform the processing illustrated in FIG. 5 is described below.

Figure 6:
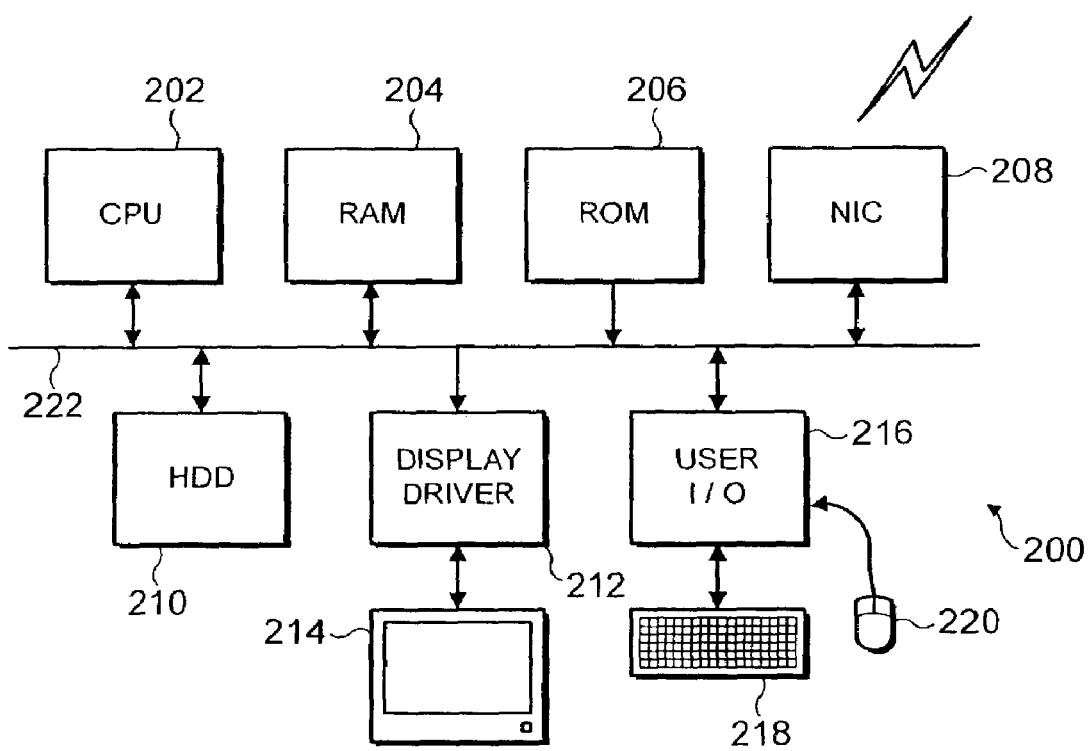
FIG. 6 is a diagram schematically illustrating the architecture of a general purpose computer that may be used to implement the analysis technique of FIG. 5.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   (i) a data processing circuit for performing data processing operations over a sequence of processing cycles in response to program instructions; and
   (ii) a tracing circuit for generating instruction trace data indicative of operation of said data processing circuit in response to said program instructions,
   wherein said instruction trace data includes at least one instruction trace word of a predetermined length encoding a sequence of trace events resulting from processing performed on consecutive processing cycles by said data processing circuit, said sequence of trace events including:
   at least one trace event corresponding to execution of a program instruction by said data processing circuit; and
   at least one trace event corresponding to other than execution of a program instruction by said data processing circuit.

2. Apparatus as claimed in claim 1, wherein said sequence of trace events comprises one or more trace events corresponding to execution of respective program instructions by said data processing circuit in combination with a trace event corresponding to a conditional program instruction not being executed.

3. Apparatus as claimed in claim 2, wherein said one or more trace events corresponding to execution of respective program instructions by said data processing circuit precede said trace event corresponding to a conditional program instruction not being executed.

4. Apparatus as claimed in claim 1, wherein said sequence of trace events comprises one or more trace events corresponding to respective wait processing cycles of said data processing circuit during which said data processing circuit waits in combination with a trace event corresponding to a program instruction being executed.

5. Apparatus as claimed in claim 4, wherein said one or more trace events corresponding to respective wait processing cycles of said data processing circuit during which said data processing circuit waits precede said trace event corresponding to a program instruction being executed.

6. Apparatus as claimed in claim 1, wherein said data processing circuit includes a processing pipeline and said at least one trace event corresponding to execution of a program instruction by said data processing circuit represents said program instruction reaching a predetermined position within said processing pipeline.

7. Apparatus as claimed in claim 6, wherein said predetermined position is one of:
   (i) commencement of execution of said program instruction; and
   (ii) completion of execution of said program instruction.

8. Apparatus as claimed in claim 1, wherein said tracing circuit is operable to generate data trace data indicative of data values processed by said data processing circuit.

9. Apparatus as claimed in claim 8, wherein said data values include data values input to said data processing circuit.

10. Apparatus as claimed in claim 8, wherein said data values include data values output from said data processing circuit.

11. Apparatus as claimed in claim 8, wherein said instruction trace data and said data trace data are interleaving within a common trace data stream.

12. Apparatus as claimed in claim 1, wherein said tracing circuit is operable in a cycle accurate mode to include within said instruction trace data information indicative of processing activity of said data processing circuit during each processing cycle.

13. Apparatus as claimed in claim 1, wherein said data processing circuit is a processor core.

14. Apparatus as claimed in claim 1, wherein said tracing circuit includes a trace data memory for buffering instruction trace data prior to output from said apparatus.

15. A method of processing data, said method comprising the steps of:
   (i) performing over a sequence of processing cycles of a data processing circuit data processing operations in response to program instructions; and
   (ii) generating instruction trace data indicative of operation of said data processing circuit in response to said program instructions,
   wherein said instruction trace data includes at least one instruction trace word of a predetermined length encoding a sequence of trace events resulting from processing performed on consecutive processing cycles by said data processing circuit, said sequence of trace events including:
   at least one trace event corresponding to execution of a program instruction by said data processing circuit; and
   at least one trace event corresponding to other than execution of a program instruction by said data processing circuit.

16. Apparatus for analysing trace data, said apparatus comprising
   analyser logic, responsive to instruction trace data including at least one instruction trace word of a predetermined length encoding a sequence of trace events resulting from processing performed on consecutive processing cycles by a data processing circuit, for identifying instruction trace words representing a sequence of trace events including:
   at least one trace event corresponding to execution of a program instruction by said data processing circuit; and
   at least one trace event corresponding to other than execution of a program instruction by said data processing circuit.

17. A method of analysing trace data, said method comprising the step of
   identifying, in response to instruction trace data including at least one instruction trace word of a predetermined length encoding a sequence of trace events resulting from processing performed on consecutive processing cycles by a data processing circuit, instruction trace words representing a sequence of trace events, said trace events including
   at least one trace event corresponding to execution of a program instruction by said data processing circuit; and
   at least one trace event corresponding to other than execution of a program instruction by said data processing circuit.

18. A computer program product comprising a computer readable medium for controlling a computer to analyse trace data, said computer program product comprising:
   (i) identifying code, in response to instruction trace data including at least one instruction trace word of a predetermined length encoding a sequence of trace events resulting from processing performed on consecutive processing cycles by a data processing circuit, for identifying instruction trace words representing a sequence of trace events, said trace events including:
   at least one trace event corresponding to execution of a program instruction by said data processing circuit; and
   at least one trace event corresponding to other than execution of a program instruction by said data processing circuit.

* * * * *